US009667722B2

(12) United States Patent
Ahuja et al.

(10) Patent No.: US 9,667,722 B2
(45) Date of Patent: May 30, 2017

(54) METHOD AND SYSTEM FOR NON-TAGGED BASED LATENCY CALCULATION

(71) Applicant: Arista Networks, Inc., Santa Clara, CA (US)

(72) Inventors: Hitesh Ahuja, Thousand Oaks, CA (US); Min Teng, Los Altos, CA (US)

(73) Assignee: Arista Networks, Inc., Santa Clara, CA (US)

( * ) Notice: Subject to any disclaimer, the term of this patent is extended or adjusted under 35 U.S.C. 154(b) by 207 days.

(21) Appl. No.: 14/518,429

(22) Filed: Oct. 20, 2014

(65) Prior Publication Data

US 2016/0112292 A1    Apr. 21, 2016

(51) Int. Cl.
*G06F 15/167*    (2006.01)
*H04L 29/08*    (2006.01)
*H04L 12/26*    (2006.01)

(52) U.S. Cl.
CPC ......... *H04L 67/1097* (2013.01); *H04L 43/04* (2013.01); *H04L 43/0852* (2013.01)

(58) Field of Classification Search
CPC ............. H04L 12/5601; H04L 12/5695; H04L 12/413; H04L 43/0852; H04L 43/0858; H04L 41/5035; H04L 47/624; H04L 1/1803; H04L 47/31; H04L 47/50; H04Q 11/0478; G06F 11/3409
USPC ............... 370/252, 253, 235, 231, 238, 412; 709/223, 224; 718/100; 710/113
See application file for complete search history.

(56) References Cited

U.S. PATENT DOCUMENTS

| 6,011,805 | A | * | 1/2000 | Esteve | ................ | H04L 1/1803 370/252 |
|---|---|---|---|---|---|---|
| 6,058,389 | A | * | 5/2000 | Chandra | ........... | G06F 17/30321 |
| 6,201,793 | B1 | * | 3/2001 | Chen | ................. | H04Q 11/0478 370/238 |
| 6,519,595 | B1 | * | 2/2003 | Rose | .................. | H04L 12/5695 370/398 |

(Continued)

FOREIGN PATENT DOCUMENTS

EP    2779542 A2    9/2014

OTHER PUBLICATIONS

International Search Report and Written Opinion in corresponding PCT/US2015/056509 mailed on Jan. 29, 2016. (10 pages).

*Primary Examiner* — Dustin Nguyen
(74) *Attorney, Agent, or Firm* — Osha Liang LLP

(57) ABSTRACT

A system and method for calculating latency including a latency calculation device configured to: receive an enqueue notification relating to a packet enqueue operation and including a queue identifier, increment an enqueue counter, and determine that a latency calculation flag is not set. Based on the determination that the latency calculation flag is not set, the latency calculation device is configured to: determine a first time corresponding to the enqueue notification, store the first time, store a latency start count, and set the latency calculation flag. The latency calculation device is also configured to: receive a dequeue notification relating to the packet dequeue operation and including the queue identifier, increment a dequeue counter, determine that the latency start count and the dequeue counter values match, determine a second time corresponding to the dequeue notification, and calculate latency as the difference between the first time and the second time.

29 Claims, 8 Drawing Sheets

(56) References Cited

U.S. PATENT DOCUMENTS

| | | | |
|---|---|---|---|
| 6,647,413 B1* | 11/2003 | Walrand | H04L 41/5035 709/224 |
| 6,954,811 B2* | 10/2005 | Vishnu | H04L 12/5601 710/113 |
| 7,631,096 B1* | 12/2009 | Yeh | H04L 12/413 370/231 |
| 8,184,540 B1 | 5/2012 | Perla et al. | |
| 8,954,968 B1* | 2/2015 | Pohl | G06F 11/3409 718/100 |
| 9,112,820 B2* | 8/2015 | Ziegler | H04L 49/901 |
| 2004/0230675 A1* | 11/2004 | Freimuth | H04L 12/5695 709/223 |
| 2006/0161647 A1 | 7/2006 | Wojtkiewicz et al. | |
| 2009/0080451 A1* | 3/2009 | Gogic | H04L 12/5695 370/412 |
| 2013/0170390 A1* | 7/2013 | Umayabashi | H04L 43/0852 370/252 |
| 2014/0119230 A1* | 5/2014 | Huey | H04L 43/0858 370/253 |
| 2016/0057065 A1* | 2/2016 | Briscoe | H04L 47/624 370/235 |

* cited by examiner

| Reported Operation | Enqueue Counter Value | Latency Start Count | Dequeue Counter Value | Latency Calculation Flag |
|---|---|---|---|---|
| EQ 1 | 1 | 1 | 0 | Set |
| DQ 1 | 1 | 1 | 1 | Remove |
| EQ 2 | 2 | 2 | 1 | Set |
| DQ 2 | 2 | 2 | 2 | Remove |
| EQ 3 | 3 | 3 | 2 | Set |
| EQ 4 | 4 | 3 | 2 | No Action |
| EQ 5 | 5 | 3 | 2 | No Action |
| DQ 3 | 5 | 3 | 3 | Remove |
| DQ 4 | 5 | 3 | 4 | No Action |
| EQ 6 | 6 | 6 | 4 | Set |
| DQ 5 | 6 | 6 | 5 | No Action |
| EQ 7 | 7 | 6 | 5 | No Action |
| DQ 6 | 7 | 6 | 6 | Remove |
| DQ 7 | 7 | 6 | 7 | No Action |

FIG. 4B

METHOD AND SYSTEM FOR NON-TAGGED BASED LATENCY CALCULATION

BACKGROUND

Computing devices often send information to and receive information from other computing devices (e.g., as packets and/or frames) via a network. Generally, on the path between the computing devices, one or more network devices exist and include functionality to propagate the information towards the destination computing device. The amount of time information takes to travel between locations in a network is known as network latency. Many factors may contribute to network latency.

SUMMARY

In general, in one aspect, the invention relates to a method for calculating latency that includes receiving, at a latency calculation device, a first enqueue notification of a first enqueue operation from a network device engine. The first enqueue notification includes a queue identifier associated with a queue and the first enqueue operation corresponds to a first packet being placed into the queue. The method also includes incrementing, based on the first enqueue notification, an enqueue counter associated with the queue identifier to obtain a current enqueue counter value and determining that a latency calculation flag corresponding to the queue identifier is not set. Additionally, based on the determination that the latency calculation flag is not set, the method includes determining a first time at which the first enqueue notification of the first enqueue operation was received, storing the first time as a latency start time associated with the queue identifier, storing the current enqueue counter value as a latency start count value, setting the latency calculation flag, and receiving a first dequeue notification of a first dequeue operation from the network device engine. The first dequeue notification comprises the queue identifier associated with the queue and the first dequeue operation corresponds to the first packet being removed from the queue. The method further includes incrementing, based on the first dequeue notification, a dequeue counter associated with the queue identifier to obtain a first current dequeue counter value, determining that the first current dequeue counter value and the latency start count value match, determining a second time at which the notification of the first dequeue operation was received, storing the second time as a latency stop time associated with the queue identifier, removing the latency calculation flag, and calculating a first latency by determining the time difference between the latency start time and the latency stop time.

In general, in one aspect, the invention relates to a system for calculating latency that includes a network device which includes a network device engine that includes a queue identified by a queue identifier. The system also includes a latency calculation device that includes functionality to receive a first enqueue notification of a first enqueue operation from the network device engine. The first enqueue notification includes the queue identifier associated with the queue and the first enqueue operation corresponds to a first packet being placed into the queue. The latency calculation device also includes functionality to increment, based on the first enqueue notification, an enqueue counter associated with the queue identifier to obtain a current enqueue counter value and determine that a latency calculation flag corresponding to the queue identifier is not set. The latency calculation device includes further functionality to, based on the determination that the latency calculation flag is not set, determine a first time at which the first enqueue notification of the first enqueue operation was received, store the first time as a latency start time associated with the queue identifier, store the current enqueue counter value as a latency start count value, set the latency calculation flag, and receive a first dequeue notification of a first dequeue operation from the network device engine. The first dequeue notification includes the queue identifier associated with the queue and the first dequeue operation corresponds to the first packet being removed from the queue. Additionally, the latency calculation device includes functionality to increment, based on the first dequeue notification, a dequeue counter associated with the queue identifier to obtain a first current dequeue counter value, determine that the first current dequeue counter value and the latency start count value match, determine a second time at which the notification of the first dequeue operation was received, store the second time as a latency stop time associated with the queue identifier, remove the latency calculation flag, and calculate a first latency by determining the time difference between the latency start time and the latency stop time.

In general, in one aspect, the invention relates to a non-transitory computer readable medium comprising instructions for calculating latency which, when executed, cause a computer processor to receive, at a latency calculation device, a first enqueue notification of a first enqueue operation from a network device engine. The first enqueue notification comprises a queue identifier associated with a queue and the first enqueue operation corresponds to a first packet being placed into the queue. The instructions further cause the computer processor to increment, based on the first enqueue notification, an enqueue counter associated with the queue identifier to obtain a current enqueue counter value and determine that a latency calculation flag corresponding to the queue identifier is not set. Additionally, the instructions cause the computer processor to, based on the determination that the latency calculation flag is not set, determine a first time at which the first enqueue notification of the first enqueue operation was received, store the first time as a latency start time associated with the queue identifier, store the current enqueue counter value as a latency start count value, set the latency calculation flag, and receive a first dequeue notification of a first dequeue operation from the network device engine. The first dequeue notification comprises the queue identifier associated with the queue and the first dequeue operation corresponds to the first packet being removed from the queue. Furthermore, the instructions cause the computer processor to increment, based on the first dequeue notification, a dequeue counter associated with the queue identifier to obtain a first current dequeue counter value, determine that the first current dequeue counter value and the latency start count value match, determine a second time at which the notification of the first dequeue operation was received, store the second time as a latency stop time associated with the queue identifier, remove the latency calculation flag, and calculate a first latency by determining the time difference between the latency start time and the latency stop time.

Other aspects of the invention will be apparent from the following description and the appended claims.

BRIEF DESCRIPTION OF DRAWINGS

FIGS. 4A-4B show an example in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4B, any component described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to calculation of latency in a network device without adding tags to packets. Specifically, the invention relates to monitoring packet enqueue operations (i.e., placing a packet in a queue) and packet dequeue operations (i.e., removing a packet from a queue) and tracking the time between the operations for a given packet in order to determine latency of the packet in a given queue. A network device may include any number of queues. For example, a network device may include 128 thousand queues. In one or more embodiments of the invention, a latency calculation device includes functionality to calculate the latency of a packet based on received notification of enqueue and dequeue operations. The latency calculation device may also include functionality to calculate latency statistics based on one or more latency calculations. The latency calculation device may include functionality to perform latency measurements and/or calculations corresponding to any number of queues. For example, the latency calculation device may include functionality to perform latency measurements and/or calculations on up to 9,000 queues. A network device may include any number of latency calculation devices.

Figure 1:
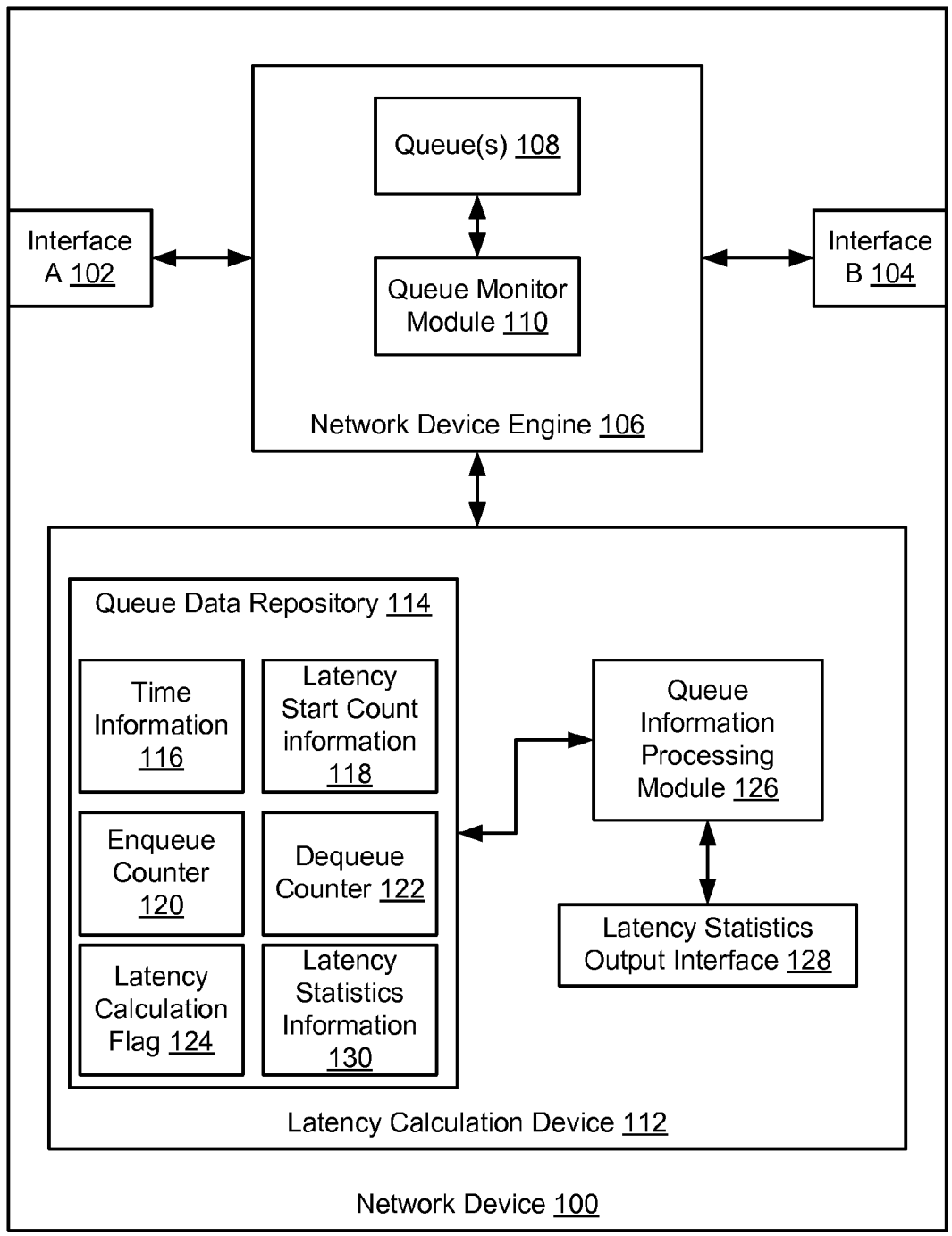
FIG. 1 shows a network device in accordance with one or more embodiments of the invention.

FIG. 1 shows a network device (100) in accordance with one or more embodiments of the invention. In one or more embodiments of the invention, the network device (100) includes one or more interfaces (e.g., interface A (102), interface B (104)), a network device engine (106), and a latency calculation device (112). The network device engine (106) may include one or more queues (e.g., queue(s) (108)) and a queue monitor module (110). The latency calculation device (112) may include a queue information processing module (126), a latency statistics output interface (128), and a queue data repository (114). The queue data repository (114) may include, but is not limited to, time information (116), latency start count information (118), an enqueue counter (120), a dequeue counter (122), a latency calculation flag (124), and latency statistics information (130). Each of these components is described below.

In one or more embodiments of the invention, a network (not shown) is a collection of one or more network devices (e.g., network device (100)) that facilitates network connectivity for one or more computing devices. In one or more embodiments of the invention, the network may be all or a portion of a computer network. A computer network may include a datacenter network, a wide area network, a local area network, a wireless network, a cellular phone network, or any other suitable network that facilitates the exchange of information from one part of the network to another. A network may be coupled with or overlap with the Internet.

In one or more embodiments of the invention, a network device (100) is a device that provides network connectivity to one or more operatively connected computing devices (not shown) and/or is operatively connected to one or more other network devices (not shown). A network device (100) may be, but is not limited to, a switch and/or a router.

A switch is a physical device that includes persistent storage, memory (e.g., Random Access Memory), one or more processors, and two or more physical interfaces (e.g., interface A (102), interface B (104)). Each interface may or may not be connected to another device on a network (e.g., a server, a switch, a router, a network virtualization controller, etc.). A switch may be configured to receive packets (e.g., encapsulated in a Media Access Control (MAC) frame) via the interfaces and determine whether to (i) drop the packet, (ii) process the packet in accordance with one or more embodiments of the invention, and/or (iii) send the packet, based on the processing, an interface of the switch.

How the switch makes the determination of whether to drop the packet or send the packet to another device on the network depends, in part, on whether the switch is a layer-2 (L2) switch or a layer-3 (L3) switch (also referred to as a multi-layer switch), which may perform at least some functions of a router. If the switch is operating as a L2 switch, the switch uses the destination MAC address along with a forwarding table to determine out of which interface to send the packet. If the switch is a multi-layer switch, the multi-layer switch includes functionality to process packets using both MAC addresses and Internet Protocol (IP) addresses.

To send packets between networks, a router, or switch performing at least some portion of the functionality of a router, may be used. A router is a network device that may be operatively connected to two or more networks and includes functionality to communicate packets between the networks. A router, similar to the L3 switch described above, uses destination IP addresses and a routing table to determine a route to the destination computing device. The routing table may include the MAC address of the next-hop device along that route, which is written as the destination MAC address of the frame in which the packet is encapsulated. The router may then send the packet out of an interface operatively connected to the next-hop device.

In one or more embodiments of the invention, the network device (100) includes one or more interfaces (e.g., interface A (102), interface B (104)). In one or more embodiments of the invention, an interface is a physical connection capable of accepting a cable and/or transceiver which creates a communication path with another device. In one or more embodiments of the invention, an interface may include functionality to facilitate, for a network device, receipt of and/or transmission of packets. In one or more embodiments of the invention, one or more interfaces are associated with one or more queues (e.g., queue(s) (108)) in which packets may be placed while awaiting processing and/or transmission. In one or more embodiments of the invention, interface A (102) and interface B (104) are operatively connected to at least one network device engine (106) of the network device (100).

In one or more embodiments of the invention, a network device engine (106) is any hardware, firmware, software, or combination thereof, capable of, at least in part, processing packets received at a network device. For example, a network device engine (106) may be an integrated circuit (e.g., an application specific integrated circuit (ASIC)) that operates in conjunction with network device firmware and/or software in order to process packets received by the network device. In one or more embodiments of the invention, the network device engine (106) is operatively connected to a latency calculation device (112). In one or more embodiments of the invention, the network device engine (106) includes functionality to obtain packets that have arrived at an interface of a network device (100) as well as to provide packets to an interface of a network device (100) from which a packet may be transmitted. A network device engine (106) may include functionality to place packets into queues (e.g., queue(s) (108)) while they await processing and/or transmission, as well as to remove packets from queues when the network device becomes ready to process and/or transmit the packets. To that end, the network device engine may include and/or be operatively connected to one or more queue(s) (108) as well as a queue monitor module (110). A network device (100) may include any number of network device engines in order to perform, at least in part, network device functionality.

In one or more embodiments of the invention, queue(s) (108) of a network device engine (106) are data constructs into which packets may be placed. For example, the queues may be virtual output queues (VOQs). A packet may be placed in a queue at any time after arriving but before being transmitted from a network device. For example, a packet may be placed into a queue after arrival at an interface of a network device but before the packet is processed. As another example, a packet may be placed in a queue after being processed, but before being transmitted from an interface of a network device. In one or more embodiments of the invention, the queue(s) (108) exist in memory and/or a storage medium (not shown) such as random access memory, read-only memory, and/or any other type of memory and/or storage medium. Each queue of a network device, or a portion thereof, may have corresponding queue identifier (e.g., virtual output queue identifier (VOQID)) for identifying the queue. A network device engine may include any number of queues. For example, a network device engine may support 27,000 VOQs.

In one or more embodiments of the invention, a queue monitor module (110) of the network device engine (106) is any collection of hardware, firmware, and/or software capable of, at least in part, monitoring queue activity of one or more queues (108) of a network device (100). In one or more embodiments of the invention, the queue monitor module (110) includes functionality to monitor a specific set of queues (e.g., always monitor the same 9,000 queues). The number of queues monitored may correspond to the number of queues for which the latency calculation device may perform latency calculations. In other embodiments of the invention, the queue monitor module includes functionality to monitor all of the queues, or any portion thereof, of a network device engine. In one or more embodiments of the invention, queue activity includes operations that place packets into queues as well as operations that remove packets from queues. An operation placing a packet into a queue may be described as an enqueue operation. An operation removing a packet from a queue may be described as a dequeue operation. The queue monitor module (110) may include functionality to monitor enqueue and/or dequeue operations. In one or more embodiments of the invention, packets that are subject to an enqueue operation are subsequently also subject to a corresponding dequeue operation, both of which are monitored by the queue monitor module (110).

In one or more embodiments of the invention, the queue monitor module includes functionality to transmit information relating to queue activity to a latency calculation device (112). Information related to queue activity may include the type of operation (i.e., enqueue or dequeue) and a queue identifier that identifies the queue for which the operation occurred. In one or more embodiments of the invention, information related to queue activity also includes a time stamp representing the time at which the operation occurred. The time stamp may be obtained by the queue monitor module (110) from a clock (not shown) and/or timer (not shown) included with and/or operatively connected to the network device engine (106). In other embodiments of the invention, the queue monitor module does not include functionality to monitor time. In such embodiments of the invention, the information related to queue activity transmitted from the queue monitor module does not include timestamp information, and information related to time is instead obtained by the latency calculation device (112) (discussed below). Receipt and transmission of packets, related queue activity, and queue monitoring are discussed further in the description below of FIGS. 2A and 2B.

In one or more embodiments of the invention, the network device (100) includes a latency calculation device (112). In one or more embodiments of the invention, a latency calculation device (112) is any collection of hardware, firmware, and/or software capable of, at least in part, calculating the latency incurred by a packet while in a queue (108) of a network device (100). For example, the latency calculation device may be a field programmable gate array (FPGA) programmed in any programming language to perform, at least in part, measurements and/or calculations related to latency. In one or more embodiments of the invention, the latency calculation device is implemented, at least in part, as a software application written in any programming language that includes instructions stored in any non-transitory computer readable medium which, when executed by one or more processors in a computing device (e.g., an FPGA, a network device, etc.), enable the computing device to perform the functions described in accordance with one or more embodiments of the invention.

In one or more embodiments of the invention, the latency calculation device (112) is operatively connected to the network device engine (106) and includes functionality to receive information related to queue activity from the queue monitor module (110) of the network device engine (106). The latency calculation device (112) may also include functionality to monitor time. For example, the latency calculation device (112) may include a timer (not shown) and/or a clock (not shown). For another example, the latency calculation device may include functionality to monitor time as measured by one or more timers and/or clocks included in a network device and/or available via a network.

A latency calculation device (112) may include functionality to only monitor a subset of the actual number of queues of a network device engine (106) at a given time. For example, a network device engine may support up to 500 thousand queues while an operatively connected latency calculation device only supports latency calculations corresponding to up to 25,000 queues at a given time. A network device (100) may include any number of latency calculation devices in order to perform, at least in part, functionality of the invention. For example, a network device that includes one or more network device engines, each of which include up to 128,000 queues, may incorporate a number of latency calculation devices (e.g., ten) sufficient to meet the latency calculation requirements of the network device.

In one or more embodiments of the invention, the latency calculation device (112) includes a queue data repository (114). In one or more embodiments of the invention, a data repository is any type of storage unit and/or device (e.g., a file system, database, collection of tables, or any other storage mechanism) for storing data/information. Specifically, the data repository may include hardware and/or software. Further, the data repository may include multiple different storage units and/or devices. The multiple different storage units and/or devices may or may not be of the same type or located at the same physical site. In one or more embodiments of the invention, the queue data repository (114) is included as a part of the latency calculation device (112). In other embodiments of the invention, the queue data repository is a separate repository that is accessed, at least, by the latency calculation device (112). For example, the queue data repository (114) may be a portion of any storage medium included with and/or accessible by the network device (100). In embodiments of the invention in which a network device includes more than one latency calculation device, each latency calculation device may have a separate queue data repository, all latency calculation devices may share the same queue data repository, and/or any combination thereof.

In one or more embodiments of the invention, the queue data repository (114) includes time information (116). In one or more embodiments of the invention, time information is information related to time. Specifically, in one or more embodiments of the invention, time information includes, but is not limited to, recorded times corresponding to notification of packet enqueue and/or dequeue operations. For example, time information related to an enqueue operation may be the time, according to a timer and/or clock, at which the queue monitor module notifies the latency calculation device that an enqueue operation occurred. For another example, time information related to a dequeue operation may be the time, according to a timer and/or clock, at which the queue monitor module notifies the latency calculation device that a dequeue operation occurred. In another example, time information may include time stamps (described above) received as part of one or more transmissions of information related to queue activity that were transmitted from the queue monitor module of the network device engine. Time information (116) corresponding to enqueue and dequeue operations may be stored for each queue, or a portion thereof, of the network device and thus each recorded time may be associated with a queue identifier. In one or more embodiments of the invention, the time information is obtained by and/or stored in the queue data repository as time information by the latency calculation device. For example, the time information may be obtained by the latency calculation device from a clock and/or timer included with and/or operatively connected to the latency calculation device.

In one or more embodiments of the invention, the queue data repository includes latency start count information (118). In one or more embodiments of the invention, the latency start count information (118) is information corresponding to an enqueue count for a given queue at which a latency calculation begins. An enqueue count may be an integer count of enqueue operations for a given queue of a network device (100). Latency start count information may also include a queue identifier that identifies the queue corresponding to the enqueue operation recorded as the latency start count.

In one or more embodiments of the invention, an enqueue count for all queues, or any portion thereof, of a network device is maintained in an enqueue counter (120) of the queue data repository (114). The enqueue counter (120) may include a collection of enqueue counts, with each queue of the network device, or any portion thereof, having a separate enqueue count. Each queue may be identified by a queue identifier that is associated with the enqueue count for the queue.

Similarly, in one or more embodiments of the invention, a dequeue count for all queues, or a portion thereof, of a network device is maintained in a dequeue counter (122) of the queue data repository (114). The dequeue counter (120) may include a collection of dequeue counts, with each queue of the network device, or a portion thereof, having a separate dequeue count. Each queue may be identified by a queue identifier that is associated with the dequeue count for the queue.

In one or more embodiments of the invention, the queue data repository (114) includes at least one latency calculation flag (124). In one or more embodiments of the invention, a latency calculation flag (124) is any information capable of representing the fact that a latency calculation is in progress on the latency calculation device. For example, the latency calculation flag may be a single bit in a register that may be set to a value of one when a latency calculation is in progress in the latency calculation device and set to zero when a latency calculation is not in progress. In one or more embodiments of the invention, there are as many latency calculation flags as there are queues for which latency is to be calculated by the latency calculation device. In such embodiments of the invention, each latency calculation flag may be associated with a queue identifier of a queue of the network device. For example, if there are 1000 queues of a network device for which latency is being monitored by the latency calculation device, there may be 1000 latency calculation flags, each of which indicate whether a latency calculation is in progress for a given queue identified by a queue identifier.

In one or more embodiments of the invention, the queue data repository (114) includes latency statistics information (130). In one or more embodiments of the invention, latency statistics information (130) is information related to the latency of packets in queues of a network device (100). Latency statistics information (130) may include individual results of one or more latency measurements performed by the latency calculation device (112). Latency statistics information may also include statistics related to latency calculated by the latency calculation device that are based on the one or more latency calculations made for a packet in a queue. For example, latency statistics information (130) may include, but is not limited to, average latency, median latency, maximum latency, minimum latency, and/or any other statistic relevant to latency. Latency statistics information (130) may also include information allowing latency calculations for a given packet in a given queue to be related to the time at which the latency occurred and/or was calculated. In one or more embodiments of the invention, latency statistics information includes aggregate information related to all queues, or a portion thereof. Furthermore, latency statistics information may include latency statistics per queue, in which case the queue may be identified by a queue identifier that is associated with the latency statistics for the queue.

In one or more embodiments of the invention, the latency calculation device (112) includes a queue information processing module (126) operatively connected to the queue data repository (114). In one or more embodiments of the invention, the queue information processing module is any hardware, firmware, software, or any combination thereof capable of processing information related to network device queues. The queue information processing module (126) may include functionality to process queue activity information received at the latency calculation device (112) from the queue monitoring module (110) of the network device engine (106). In one or more embodiments of the invention, the queue information processing module (126) includes functionality to place information related to queues into the queue data repository (114). The queue information processing module (126) may also include functionality to use information related to queues and/or time information from the queue data repository in order to calculate the latency of a given packet in a given queue. In one or more embodiments of the invention, the queue information processing module includes functionality to calculate latency statistics. The queue information processing module (126) may include functionality to perform one or more latency calculations serially and/or in parallel. For example, the queue information processing module may include functionality to be engaged in latency measurement/calculation corresponding to packets in up to 9,000 queues at the same and/or substantially similar time. In one or more embodiments of the invention, the queue information processing module (126) includes functionality to perform a portion of the latency calculations in order to allow another entity to perform additional latency calculations using the latency calculations performed by the queue information processing module. For example, the queue information processing module may include functionality to perform basic latency calculations for one or more given queues (e.g., measure time between an enqueue operation and a corresponding dequeue operation), which may be used later by software executing on a separate computing device (not shown) when calculating latency statistics such as, for example, average latency and/or median latency. In one or more embodiments of the invention, the queue information processing module (126) includes functionality to provide information related to latency to an operatively connected latency statistics output interface (128).

In one or more embodiments of the invention, the latency calculation device (112) includes a latency statistics output interface (128) which is operatively connected to the queue information processing module (126). In one or more embodiments of the invention, the latency statistics output interface (112) is any interface capable of transmitting information related to latency that is measured and/or calculated by the latency calculation device (112). For example, the latency statistics output interface (128) may be an interface capable of providing latency statistics information via a command line interface of the network device. In another example, the latency statistics output interface may be an interface capable of providing latency statistics information to a software module capable of rendering a graphical user interface that displays the latency statistics information visually to an interested entity. In still another example, the latency statistics output interface may include functionality to initiate a transmission of latency statistics information from memory (not shown) of the network device to the memory of a host (e.g., computing device such as a server) that is operatively connected to the network device. In such embodiments of the invention, the transmission of latency statistics information may, for example, be conducted via direct memory access (DMA) of the memory of the operatively connected host. Latency measurements/calculations and latency statistics calculations by the latency calculation device are discussed further in the description below of FIGS. 3A-3C.

The invention is not limited to the network device configuration shown in FIG. 1. For example, the latency calculation device, rather than being separate from and operatively connected to the network device engine, may instead be included in the network device engine.

FIGS. 2A-3C show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 2A-3C may be performed in parallel with any other steps shown in FIGS. 2A-3C without departing from the invention.

Figure 2A:
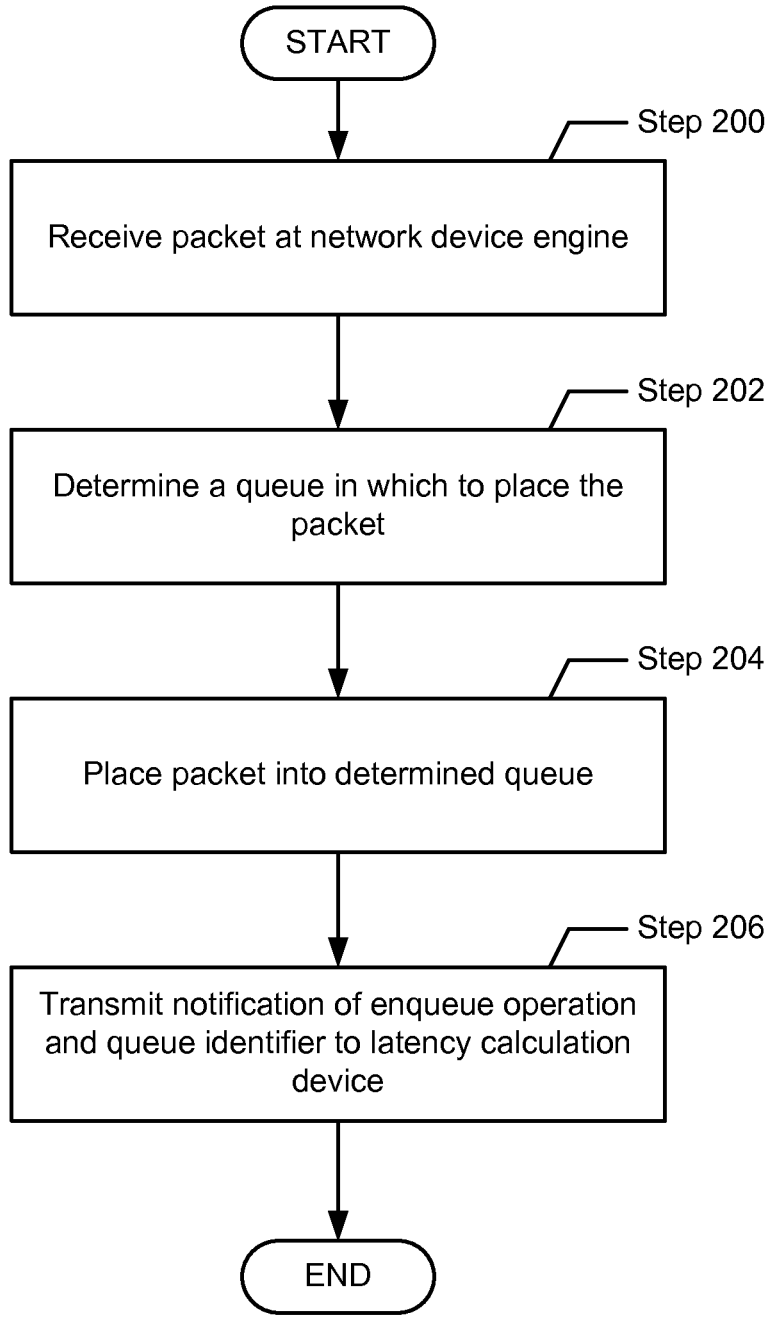
FIG. 2A shows a method for receiving a packet at a network device engine in accordance with one or more embodiments of the invention.

Turning to FIG. 2A, FIG. 2A shows a method for receiving a packet at a network device engine in accordance with one or more embodiments of the invention. In Step 200, a packet is received at a network device engine. In one or more embodiments of the invention, the packet was received at an interface of a network device. The packet may have arrived at the interface encapsulated in a MAC frame. In one or more embodiments of the invention, the packet is passed to the network device engine in whatever form it arrived at the interface of the network device. In other embodiments of the invention, some processing may have occurred related to the packet before the packet arrives at the network device engine.

In Step 202, the network device engine determines a queue in which to place the packet. Queues may be associated with interfaces by the network device engine in any manner consistent with embodiments of the invention. In one or more embodiments of the invention, the queue in which a packet is placed is determined based on the ingress interface of the packet, the egress interface of the packet, a combination thereof, and/or any other information related to and/or included in the packet. In one or more embodiments of the invention, each queue is identified by a queue identifier (e.g., VOQID) that is known by the network device engine. In one or more embodiments of the invention, the queue determination is made, in part, based on processing of the packet. In other embodiments of the invention, the queue determination is made before processing occurs related to the packet.

In Step 204, the packet is placed into the queue determined in Step 202. In one or more embodiments of the invention, the action of placing a packet into a queue is an enqueue operation.

In Step 206, notification of the enqueue operation is transmitted to the latency calculation device. In one or more embodiments of the invention, the notification includes, at least, the event type as enqueue and a queue identifier. In one or more embodiments of the invention, the notification also optionally includes a time stamp that identifies the time at which the enqueue operation occurred. For example, in embodiments of the invention in which the latency calculation device is an FPGA, the network device engine may be physically connected (e.g., via a wire) to an input interface of the FPGA and the notification may be transmitted to the FPGA via the physical connection.

Figure 2B:
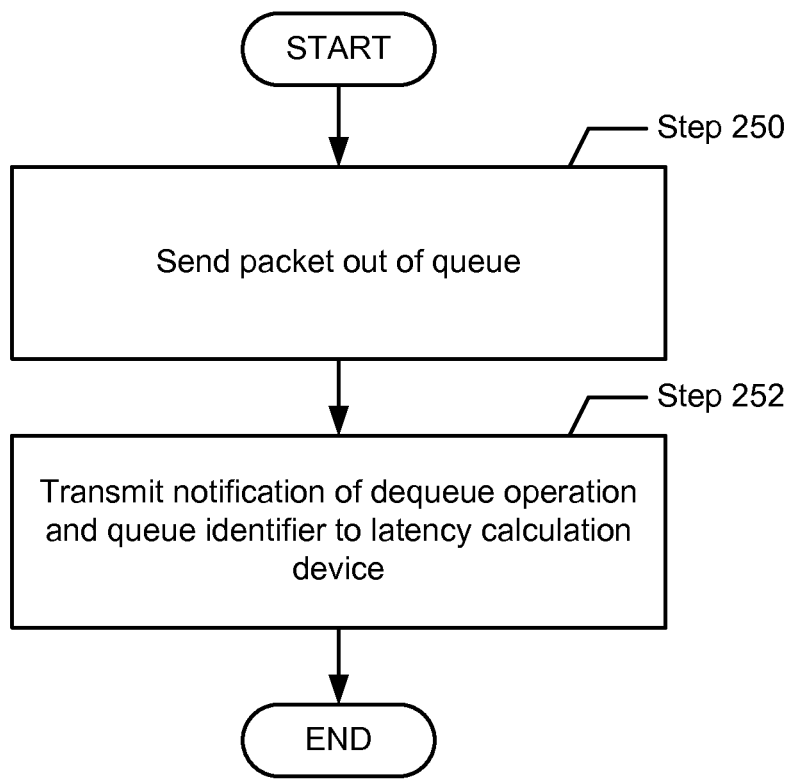
FIG. 2B shows a method for transmitting a packet from a network device queue in accordance with one or more embodiments of the invention.

FIG. 2B shows a method for transmitting a packet out of a network device queue in accordance with one or more embodiments of the invention. In Step 250, a packet is sent out of a queue of a network device. In one or more embodiments of the invention, the removal of the packet from the queue is a dequeue operation. In one or more embodiments of the invention, the packet is dequeued in order to be processed, further processed, and/or transmitted by the network device engine. In embodiments of the invention in which processing of the packet occurred before the packet was placed into a queue, sending the packet from the queue may include sending the packet to an egress interface to be transmitted from the network device.

In Step 252, notification of the dequeue operation is transmitted to the latency calculation device. In one or more embodiments of the invention, the notification includes, at least, the event type as dequeue and a queue identifier. In one or more embodiments of the invention, the notification also optionally includes a time stamp that identifies the time at which the dequeue operation occurred. The dequeue operation notification may be transmitted to the latency calculation device in substantially the same way as the enqueue operation was transmitted to the latency calculation device in Step 206 of FIG. 2A.

Figure 3A:
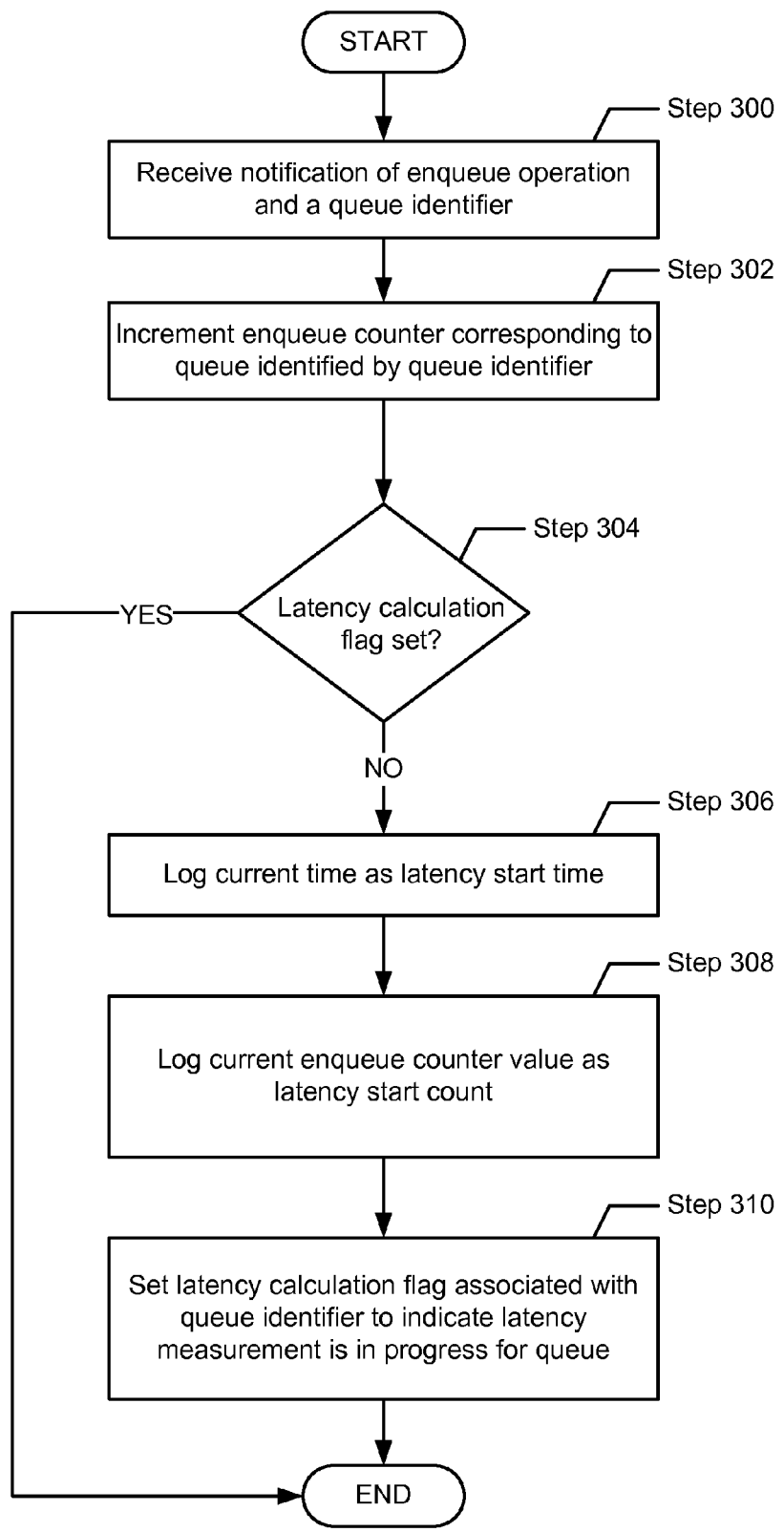
FIG. 3A shows a method for starting a latency calculation in accordance with one or more embodiments of the invention.

FIG. 3A shows a method for starting a latency calculation in accordance with one or more embodiments of the invention. In Step 300, notification of an enqueue operation is received at the latency calculation device. In one or more embodiments of the invention, the notification includes, at least, the type of operation (i.e., enqueue) and a queue identifier. The queue identifier may allow the latency calculation device to associate the enqueue operation with the specific queue to which the enqueue operation corresponds. In one or more embodiments of the invention, the notification also optionally includes a time stamp corresponding to the time at which the enqueue operation occurred.

In Step 302, an enqueue counter corresponding to the queue identified by the queue identifier is incremented. In one or more embodiments of the invention, incrementing the enqueue counter includes adding a value of one to an existing value of the enqueue counter to represent that one additional enqueue operation has occurred for a given queue. In one or more embodiments of the invention, the enqueue counter is stored in the queue data repository and is incremented by the queue information processing module of the latency calculation device.

In Step 304, a determination is made whether a latency calculation flag is set. In one or more embodiments of the invention, the relevant latency calculation flag is the one corresponding to the queue identified by the queue identifier delivered as part of the notification of the enqueue operation. If the latency calculation flag for the queue that experienced an enqueue operation is set, then a latency calculation is in progress for that queue and the process is complete. If the latency calculation flag is not set, the process proceeds to Step 306.

In Step 306, a latency start time is recorded. In one or more embodiments of the invention, the latency start time is the time, according to a timer and/or clock accessible by the latency calculation device, at which the notification of the enqueue operation arrived at the latency calculation device. In other embodiments of the invention, the latency start time may be the time stamp included with the received notification of the enqueue operation that corresponds to the time at which the enqueue operation occurred. In still other embodiments of the invention, a timer is started when the notification arrives at the latency calculation device. In such embodiments of the invention, the timer may be associated with the queue identifier of the queue in which the enqueue operation occurs. In one or more embodiments of the invention, the latency start time is stored as time information in the queue data repository. The latency start time may be stored along with the queue identifier in order to allow latency calculation using the latency start time.

In Step 308, the current enqueue counter value for the queue identified by the queue identifier is recorded as the latency start count. In one or more embodiments of the invention, the current value of the enqueue counter is the value to which the enqueue counter was incremented in Step 302.

In Step 310, a latency calculation flag is set. In one or more embodiments of the invention, the latency calculation flag that is set is the latency calculation flag corresponding to the queue identified by the queue identifier that was included in the notification of the enqueue operation. Setting the latency calculation flag for a queue may provide indication that a latency calculation is currently in progress for the queue.

Figure 3B:
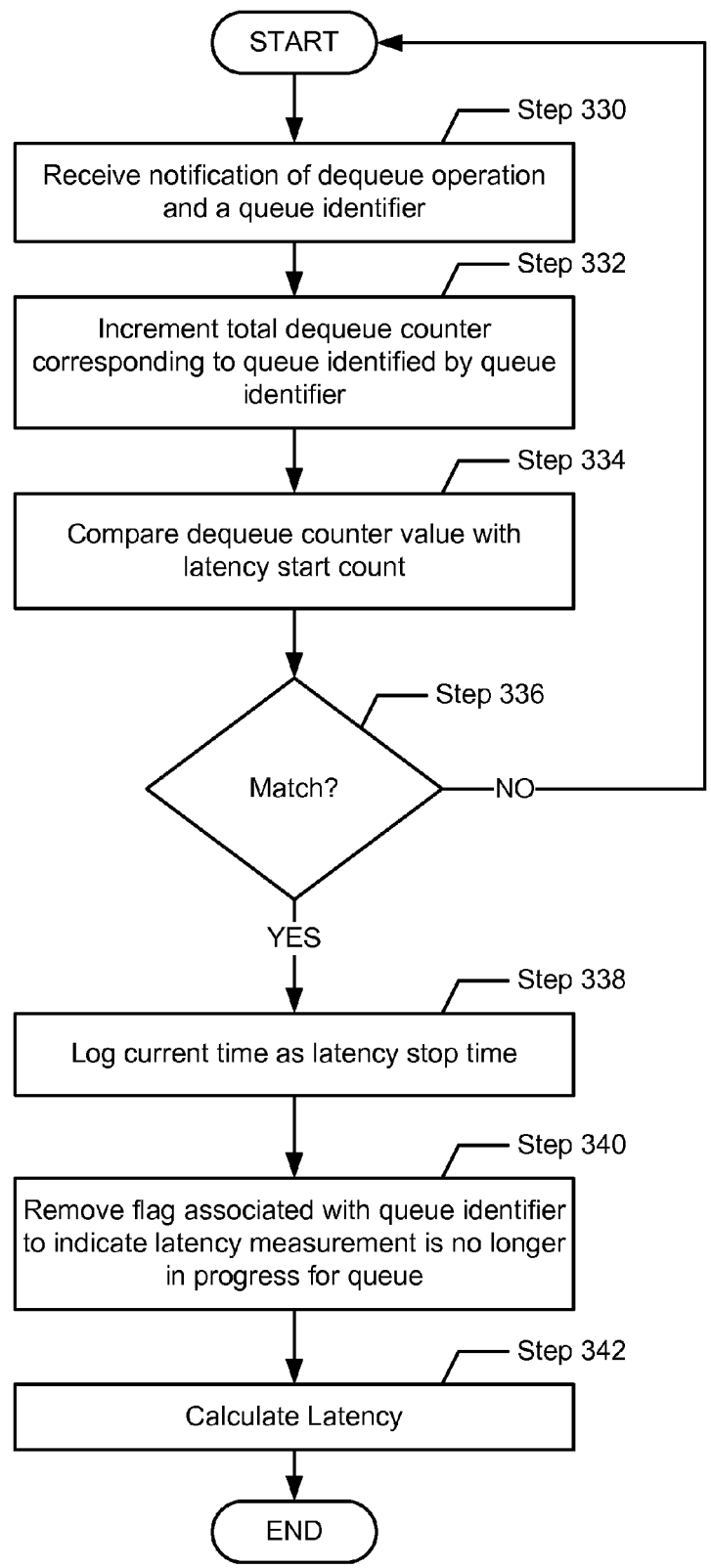
FIG. 3B shows a method for completing a latency calculation in accordance with one or more embodiments of the invention.

FIG. 3B shows a method for completing a latency calculation in accordance with one or more embodiments of the invention. In Step 330, notification of a dequeue operation is received at the latency calculation device. In one or more embodiments of the invention, the notification includes, at least, the type of operation (i.e., dequeue) and a queue identifier. The queue identifier may allow the latency calculation device to associate the dequeue operation with the specific queue to which the dequeue operation corresponds. In one or more embodiments of the invention, the notification also optionally includes a time stamp that identifies the time at which the dequeue operation occurred.

In Step 332, a dequeue counter corresponding to the queue identified by the queue identifier is incremented. In one or more embodiments of the invention, incrementing the dequeue counter includes adding a value of one to an existing value of the dequeue counter to represent that one additional dequeue operation has occurred for the given queue. In one or more embodiments of the invention, the dequeue counter is stored in the queue data repository and is incremented by the queue information processing module of the latency calculation device.

In Step 334, the current value of the dequeue counter (i.e., the value to which the dequeue counter was incremented in Step 332) for the queue is compared to the latency start count value (i.e., the latency start count value stored in Step 308 of FIG. 3A) for the same queue (as identified by the queue identifier). In one or more embodiments of the invention, the queue information processing module performs the comparison between the latency start count value and the dequeue counter value. In one or more embodiments of the invention, the comparison is performed by determining and/or obtaining the value of each counter and determining if they are equivalent.

In Step 336, a determination is made as to whether the latency start count value and the dequeue counter value obtained in Step 334 match. If the enqueue counter value and the dequeue counter value do not match the process returns to the starting point and awaits notification of another dequeue operation. If the enqueue counter value and the dequeue counter value do match, the process proceeds to Step 338.

In Step 338, a latency stop time is recorded. In one or more embodiments of the invention, the latency stop time is the time, according to a timer and/or clock accessible by the latency calculation device, at which the notification of the dequeue operation arrived at the latency calculation device. In other embodiments of the invention, the latency stop time may be the time stamp included with the received notification of the dequeue operation that corresponds to the time at which the dequeue operation occurred. In one or more embodiments of the invention, the notification of the dequeue operation causes the dequeue counter to be incremented to match the latency start count value. In one or more embodiments of the invention, the latency stop time is stored as time information in the queue data repository. The latency stop time may be stored along with the queue identifier in order to allow latency calculations using the latency stop time.

In Step 340, the latency calculation flag for the queue identified by the queue identifier (i.e., the latency calculation flag that was set in Step 310 of FIG. 3A) is removed. In one or more embodiments of the invention, the latency calculation flag that is removed is the latency calculation flag corresponding to the queue identified by the queue identifier. Removing the latency calculation flag for a queue may provide indication that a latency calculation is no longer currently in progress for the queue.

In Step 342, latency is calculated. In one or more embodiments of the invention, latency is calculated by calculating the difference between the latency start time and the latency stop time. For example, if the difference between the latency start time and the latency stop time is thirty milliseconds, then the calculated latency for the packet in a queue is thirty milliseconds.

Figure 3C:
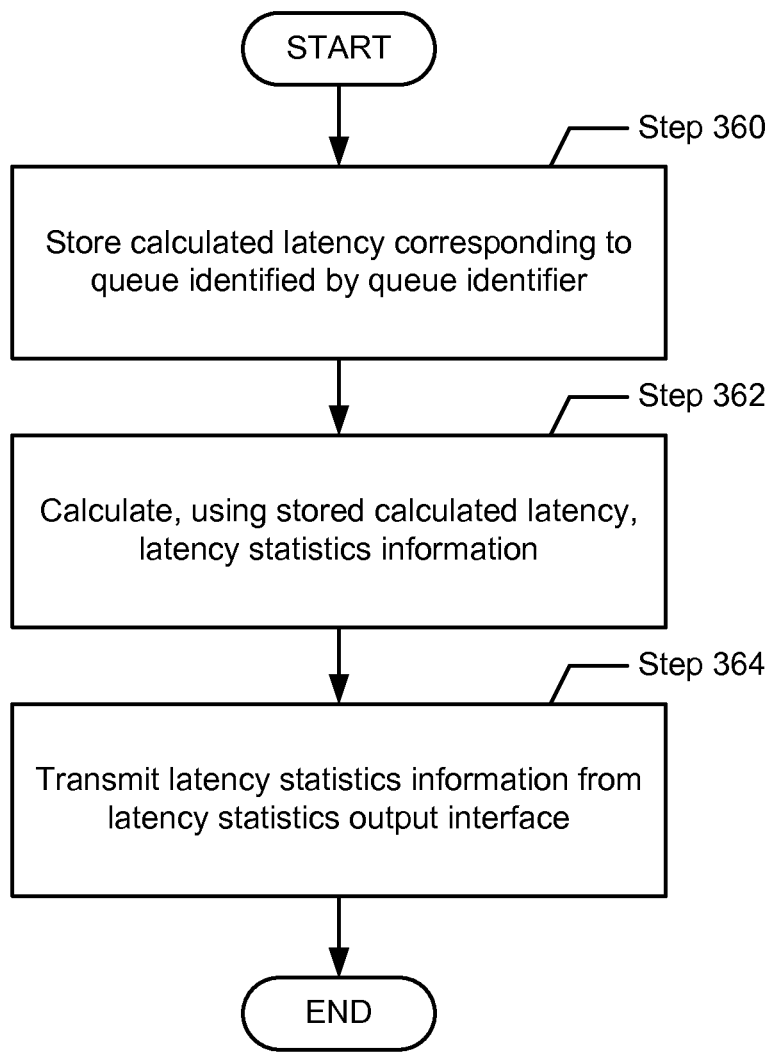
FIG. 3C shows a method for calculating latency statistics in accordance with one or more embodiments of the invention.

FIG. 3C shows a method for calculating latency statistics in accordance with one or more embodiments of the invention. In Step 360, the latency calculated in Step 342 of FIG. 3C is stored. In one or more embodiments of the invention, the calculated latency value is stored along with the queue identifier of the queue to which the latency calculation corresponds. The calculated latency value for the queue may be stored as latency statistics information in the queue data repository.

In Step 362, latency statistics information is calculated, at least in part, using the calculated latency that was stored in Step 360. In one or more embodiments of the invention, the stored latency is used in conjunction with other latencies calculated for the queue in order to calculate latency statistics information. For example, the calculated latency may be compared with other calculated latencies for the same queue to determine if the calculated latency is a maximum latency seen for the queue. For another example, the calculated latency may be included in a calculation to determine the average and/or median latency for the queue. In one or more embodiments of the invention, the stored calculated latency is used in conjunction with latency values calculated for one or more different queues. For example, the calculated latency values in a given range of time for all queues may be used to calculate an overall average and/or maximum latency for the network device. In one or more embodiments of the invention, the latency statistics information obtained using the calculated latencies for queues is calculated by the queue information processing module of the latency calculation device. In other embodiments of the invention, one or more latencies calculated by the queue information processing module may be provided to an external entity which performs additional calculations in order to obtain additional latency statistics information. For example, software executing on a computing device operatively connected to the latency statistics output interface of the latency calculation device may receive latency information and/or statistics from the latency calculation device which is then used to perform additional calculations related to latency.

In Step 364, latency statistics are transmitted from the latency statistics output interface. In one or more embodiments of the invention, latency statistics are transmitted to a location accessible by an entity interested in latency statistics. For example, the latency statistics output interface may perform a DMA operation in order to place the latency statistics information in the memory of a host server operatively connected to the network device. An entity such as a user and/or an application (e.g., the aforementioned software executing on an operatively connected computing device) may then access the latency statistics.

Figure 4A:
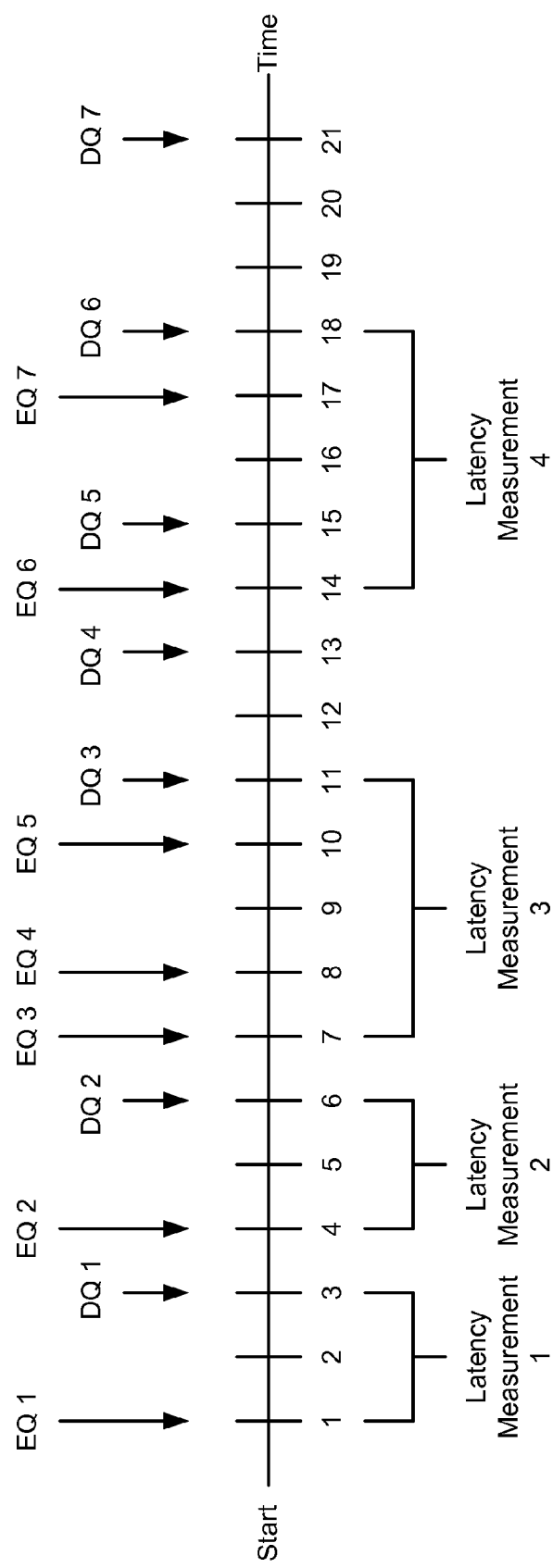

FIGS. 4A and 4B show an example in accordance with one or more embodiments of the invention. The following example is for explanatory purposes only and not intended to limit the scope of the invention. The example shown by FIGS. 4A and 4B is based on the system shown in FIG. 1. While this example focuses on latency calculation for packets being enqueued into and dequeued from a single queue, one of ordinary skill in the art and having the benefit of this disclosure will appreciate that latency calculations may be performed by the latency calculation device on any number of network device queues at the same and/or similar times. Furthermore, there may be any number of latency calculation devices performing functionality related to measuring and/or calculating latency in a given network device.

Referring to FIG. 4A, consider a scenario in which a network device is configured with at least one latency calculation device. The latency calculation device is an FPGA programmed to perform calculations related to latency of packets and includes a queue information processing module, a queue data repository, and a latency statistics output interface. The network device also includes a network device engine (e.g., an ASIC) that includes functionality to perform enqueue operations placing a packet into a queue and dequeue operations removing a packet from a queue. The network device engine includes a queue monitor module that is configured to send notifications of enqueue operations and dequeue operations to the latency calculation device. The network device is operatively connected to a host server to which latency statistics information is transmitted.

FIG. 4A shows a timeline that includes twenty-one consecutive units of time that are measured by a clock included with the latency calculation device. A first packet (P1) arrives at the network device. The network device engine determines the appropriate queue in which to place the packet and then performs an enqueue operation to place the packet in the queue. The queue that is determined to be appropriate for the packet P1 is identified by queue identifier 27. At time=1 the queue monitor module of the network device engine notifies the latency calculation device that an enqueue operation (EQ1) has occurred. The queue information processing module of the latency calculation device, upon receiving the notification, increments the enqueue counter corresponding to queue 27 from zero to one. The latency calculation device then checks the latency calculation flag corresponding to queue 27 and determines that it is not set. Therefore, the queue information processing unit stores the time (i.e., time=1) at which notification of the enqueue operation arrives in the time information of the queue data repository along with the queue identifier 27. Next, the queue information processing module stores the current enqueue counter value for queue 27 as the latency start count in the queue data repository along with the queue identifier. The current enqueue counter value for queue 27 at this point is one, which is the value stored as the latency start count. The queue information processing module then sets the latency calculation flag corresponding to queue 27.

FIG. 4B shows a table of values for each event that occurs along the timeline shown in FIG. 4A. For each reported enqueue or dequeue operation, the enqueue counter value, the latency start count value, the dequeue counter value, and the action taken regarding the latency calculation flag are shown. Thus, for EQ1, the table of FIG. 4B indicates that the enqueue counter value is one, the latency start count is one, the dequeue counter value is zero (because there have not yet been any dequeue operations at the time of EQ1), and the latency calculation flag for queue 27 has been set.

The next event shown on the timeline of FIG. 4A is a dequeue event (DQ1) corresponding to queue 27. The packet P1 that was enqueued at EQ1 has now been subject to a dequeue operation, and therefore the queue monitor module of the network device engine notifies the latency calculation device of the dequeue operation at time=3. The queue information processing module of the latency calculation device, upon receiving the notification, increments the dequeue counter corresponding to queue 27 from zero to one. The queue information processing module then performs a comparison between the latency start count value for queue 27 and the current dequeue counter value, which was just incremented to one. The current latency start count value for queue 27 is one, and therefore the latency start count value and the current dequeue counter value are equivalent. Therefore, the queue information processing unit stores the time (i.e., 3) at which notification of the dequeue operation arrives in the time information of the queue data repository along with the queue identifier 27. The queue information processing module then removes the latency calculation flag for queue 27 to indicate that a latency measurement is no longer in progress for queue 27, allowing the latency calculation device to be ready to start another latency calculation for queue 27 at the next or any subsequent enqueue event. The entry in the table of FIG. 4B for DQ1 shows that the enqueue counter value is one, the latency start count is one, the dequeue counter value is one, and the latency calculation flag for queue 27 has been removed.

Next, the queue information processing module calculates the latency of the packet that was enqueued into queue 27 at EQ1 and dequeued from queue 27 at DQ1. The calculation involves determining the time difference between EQ1 and DQ1, which is two (i.e., (time=3) minus (time=1)). Therefore, the latency calculated by the latency calculation device is two for packet P1 in queue 27. The queue information processing module stores the calculated latency for P1 in the latency statistics information of the queue data repository along with the queue identifier 27. After each latency calculation for a given queue, the queue information processing module of the latency calculation device calculates latency statistics for the queue that include average latency of the queue and maximum latency of the queue. At this point, there is only one calculated latency value for queue 27, which is two. Therefore, both the average latency and the maximum latency for queue 27 are also two. The average latency and maximum latency for queue 27 are stored as latency statistics information in the queue data repository and transmitted by the latency statistics output interface via DMA to the memory of the operatively connected host server. One of ordinary skill in the art and having the benefit of this disclosure will appreciate that although the preceding discussion of latency statistics calculation indicates that the queue information processing module performs such calculations, in some embodiments of the invention at least a portion of the latency statistics calculations may be performed using software. In such embodiments of the invention, the software may be either executing on the latency calculation device or may be executing on a computing device remote from but operatively connected to the latency calculation device.

The next event shown on the timeline of FIG. 4A is an enqueue event (EQ2) at time=4 corresponding to a second packet P2 being placed into queue 27. There is no latency calculation currently in progress for queue 27, so the latency calculation flag for queue 27 is not set. Therefore, the queue information processing module performs similar steps for the enqueue operation corresponding to packet P2 as were performed for the enqueue operation corresponding to packet P1 (described above). Thus, the entry in the table of FIG. 4B for EQ2 shows that the enqueue counter value is two, the latency start count is two, the dequeue counter value is one, and the latency calculation flag for queue 27 has been set.

While, in the present example, the latency calculation device is configured to begin an additional latency calculation at the first enqueue operation following a dequeue operation causing removal of the latency calculation flag, one skilled in the art and having the benefit of this disclosure will recognize that the latency calculation device may instead begin an additional latency calculation, if at all, on any subsequent enqueue operation while remaining consistent with embodiments of this invention. For example, the latency calculation device may include functionality to perform calculations related to latency in response to only a portion of received enqueue operation enqueue operations for which notification is received while no latency calculation flag is set, while performing any other operations when not performing functionality related to latency calculation.

FIG. 4A shows that the event following EQ2 is a dequeue event (DQ2) at time=6 corresponding to the dequeueing of packet P2 from queue 27. Notification of DQ2 causes the dequeue counter for queue 27 to be incremented by the queue information processing module to two. Therefore, the latency start count value (which corresponds to the value of the enqueue counter after being incremented in response to EQ2) and the dequeue counter value match. Thus, the queue information processing module, similar to the operations described above in relation to DQ1, records time=6 as the latency stop time, removes the latency calculation flag for queue 27, and calculates the latency of packet P2. The entry in the table of FIG. 4B for DQ2 shows that the enqueue counter value is two, the latency start count is two, the dequeue counter value is two, and the latency calculation flag for queue 27 has been removed.

The calculation involves determining the time difference between EQ2 and DQ2, which is two (i.e., (time=6) minus (time=4)). Therefore, the latency calculated by the latency calculation device is two for packet P2 in queue 27. The queue information processing module stores the calculated latency for P2 in the latency statistics information of the queue data repository along with the queue identifier 27. The queue information processing module then re-calculates the average latency and maximum latency for queue 27 based on the two latencies calculated (i.e., for P1 and P2). Because the latency corresponding to P2 and the latency corresponding to P1 are both two, the average latency of queue 27 remains two and the maximum latency of queue 27 remains two. The average latency value and maximum latency value for queue 27 are stored as latency statistics information in the queue data repository and transmitted via DMA to the memory of the operatively connected host server.

The next event shown on the timeline of FIG. 4A is an enqueue event (EQ3) at time=7 corresponding to a third packet P3 being placed into queue 27. There is no latency calculation currently in progress for queue 27, so the latency calculation flag for queue 27 is not set. Therefore, the queue information processing module performs similar steps for the enqueue operation corresponding to packet P3 as was performed for the enqueue operation corresponding to packets P1 and P2. Thus, the entry in the table of FIG. 4B for EQ3 shows that the enqueue counter value is three, the latency start count is three, the dequeue counter value is two, and the latency calculation flag for queue 27 has been set.

The next two events shown on the timeline of FIG. 4A are enqueue events EQ4 (at time=7) and EQ5 (at time=8) corresponding to notification of packets P4 and P5, respectively, being placed into queue 27. For each of these enqueue events, the queue monitor module of the network device engine sends notification to the latency calculation device. The queue information processing module of the latency calculation device increments the enqueue counter for queue 27 once for each of EQ4 and EQ5. However, at the time of each of EQ4 and EQ5 are received, the latency calculation flag set in response to EQ3 remains set. Therefore, no other action is taken in regards to EQ4 or EQ5 and the latency calculation that began at time=6 corresponding to EQ3 remains in progress. The entry in the table of FIG. 4B for EQ4 shows that the enqueue counter value is four, the latency start count is three, the dequeue counter value is two, and the no action is taken regarding the latency calculation flag for queue 27, which remains set. The entry in the table of FIG. 4B for EQ5 shows that the enqueue counter value is five, the latency start count is three, the dequeue counter value is two, and that no action is taken regarding the latency calculation flag for queue 27, which remains set.

FIG. 4A shows that the event following EQ5 is a dequeue event (DQ3) at time=11 corresponding to the removal of packet P3 from queue 27. Notification of DQ3 causes the dequeue counter for queue 27 to be incremented by the queue information processing module to three. Therefore, the latency start count value (which corresponds to the value of the enqueue counter after being incremented in response to EQ3) and the dequeue counter value match. Thus, the queue information processing module, similar to the operations described above in relation to DQ1, records time=11 as the latency stop time, removes the latency calculation flag for queue 27, and calculates the latency of packet P3 in queue 27. The entry in the table of FIG. 4B for DQ3 shows that the enqueue counter value is five, the latency start count is three, the dequeue counter value is three, and the latency calculation flag for queue 27 has been removed.

The calculation of latency for P3 in queue 27 involves determining the time difference between EQ3 and DQ3, which is four (i.e., (time=11) minus (time=7)). The queue information processing module stores the calculated latency for P3 in the latency statistics information of the queue data repository along with the queue identifier 27. The queue information processing module then re-calculates the average latency and maximum latency for queue 27 based on the three latencies calculated (i.e., for P1, P2, and P3). The average latency is the sum of all calculated latencies divided by the number of calculated latencies. Therefore, the average latency after P3 latency has been calculated is the latency of P1 plus the latency of P2 plus the latency of P3 divided by three ((2+2+4)/3) which equals 2.67. The maximum latency is the largest latency seen in queue 27, which is the latency corresponding to P3 (i.e., four). The average latency value and maximum latency value for queue 27 are stored as latency statistics information in the queue data repository and transmitted via DMA to the memory of the operatively connected host server.

The next event shown on the timeline of FIG. 4A is a dequeue event (DQ4) at time=13 corresponding to notification of packet P4 being removed from queue 27. For this dequeue events, the queue monitor module of the network device engine sends notification to the latency calculation device. The queue information processing module of the latency calculation device increments the dequeue counter for queue 27 once for DQ4, making the value of the dequeue counter four. However, a comparison of the current latency start count value (i.e., three) and the current value of the dequeue counter (i.e., four) indicates that the two values are not equivalent. Therefore, no other action is taken in regards to DQ4. The entry in the table of FIG. 4B for DQ4 shows that the enqueue counter value is five, the latency start count is three, the dequeue counter value is four, and the no action is taken regarding the latency calculation flag for queue 27, which remains set.

The next event shown on the timeline of FIG. 4A after DQ4 is an enqueue event (EQ6) at time=14 corresponding to a sixth packet P6 being placed into queue 27. There is no latency calculation currently in progress for queue 27, so the latency calculation flag for queue 27 is not set. Therefore, the queue information processing module performs similar steps for the enqueue operation corresponding to packet P6 as were performed for the enqueue operation corresponding to packets P1, P2, and P3. Thus, the entry in the table of FIG. 4B for EQ6 shows that the enqueue counter value is six, the latency start count is six, the dequeue counter value is four, and the latency calculation flag for queue 27 has been set.

The next event shown on the timeline of FIG. 4A after EQ6 is a dequeue event (DQ5) at time=15 corresponding to notification of packet P5 being removed from queue 27. For this dequeue events, the queue monitor module of the network device engine sends notification to the latency calculation device. The queue information processing module of the latency calculation device increments the dequeue counter for queue 27 once for DQ5, making the value of the dequeue counter five. However, a comparison of the current latency start count value (i.e., six) and the current value of the dequeue counter (i.e., five) indicates that the two values are not equivalent. Therefore, no other action is taken in regards to DQ5. The entry in the table of FIG. 4B for DQ5 shows that the enqueue counter value is six, the latency start count is six, the dequeue counter value is five, and the no action is taken regarding the latency calculation flag for queue 27, which remains set.

The next event shown on the timeline of FIG. 4A after DQ5 is an enqueue event (EQ7) at time=17 corresponding to notification of packet P7 being placed into queue 27. For this enqueue event, the queue monitor module of the network device engine sends notification to the latency calculation device. The queue information processing module of the latency calculation device increments the enqueue counter for queue 27 once for EQ7. However, at the time of EQ7, the latency calculation flag set in response to EQ6 remains set. Therefore, no other action is taken in regards to EQ7 and the latency calculation that began at time=14 corresponding to EQ6 remains in progress. The entry in the table of FIG. 4B for EQ7 shows that the enqueue counter value is seven, the latency start count is six, the dequeue counter value is five, and that no action is taken regarding the latency calculation flag for queue 27, which remains set.

FIG. 4A shows that the event following EQ7 is a dequeue event (DQ6) at time=18 corresponding to the removal of packet P6 from queue 27. Notification of DQ6 causes the dequeue counter for queue 27 to be incremented by the queue information processing module to six. Therefore, the latency start count value (which corresponds to the value of the enqueue counter after being incremented in response to EQ6) and the dequeue counter value match. Thus, the queue information processing module, similar to the operations described above in relation to DQ1, records time=18 as the latency stop time, removes the latency calculation flag for queue 27, and calculates the latency of packet P6 in queue 27. The entry in the table of FIG. 4B for DQ6 shows that the enqueue counter value is six, the latency start count is six, the dequeue counter value is six, and the latency calculation flag for queue 27 has been removed.

The calculation of latency for P6 in queue 27 involves determining the time difference between EQ6 and DQ6, which is four (i.e., (time=18) minus (time=14)). The queue information processing module stores the calculated latency for P6 in the latency statistics information of the queue data repository along with the queue identifier 27. The queue information processing module then re-calculates the average latency and maximum latency for queue 27 based on the four latencies calculated (i.e., for P1, P2, P3, and P6). The average latency is the sum of all calculated latencies divided by the number of calculated latencies. Therefore, the average latency after P3 latency has been calculated is the latency of P1 plus the latency of P2 plus the latency of P3 plus the latency of P6 divided by four ((2+2+4+4)/4) which equals three. The maximum latency is the largest latency seen in queue 27, which is the latency corresponding to P3 and P6 (i.e., four). The average latency value and maximum latency value for queue 27 are again stored as latency statistics information in the queue data repository and transmitted via DMA to the memory of the operatively connected host server.

The next event shown on the timeline of FIG. 4A after DQ6 is a dequeue event (DQ7) at time=21 corresponding to notification of packet P7 being removed from queue 27. For this dequeue events, the queue monitor module of the network device engine sends notification to the latency calculation device. The queue information processing module of the latency calculation device increments the dequeue counter for queue 27 once for DQ7, making the value of the dequeue counter seven. However, a comparison of the current latency start count value (i.e., six) and the current value of the dequeue counter (i.e., seven) indicates that the two values are not equivalent. Therefore, no other action is taken in regards to DQ7. The entry in the table of FIG. 4B for DQ7 shows that the enqueue counter value is seven, the latency start count is six, the dequeue counter value is seven, and the no action is taken regarding the latency calculation flag for queue 27, which remains set.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for calculating latency comprising:
receiving, at a latency calculation device and from a network device engine, a first enqueue notification of a first enqueue operation, wherein the first enqueue notification comprises a queue identifier associated with a queue and wherein the first enqueue operation corresponds to a first packet being placed into the queue;
incrementing, based on the first enqueue notification, an enqueue counter associated with the queue identifier to obtain a current enqueue counter value;
determining that a latency calculation flag corresponding to the queue identifier is not set; and
based on the determination that the latency calculation flag is not set:
setting a latency start time based on receiving the first enqueue notification;
setting a latency stop time based on receiving a first dequeue notification associated with a first dequeue operation; and
calculating a first latency by determining a time difference between the latency start time and the latency stop time.

2. The method of claim 1, further comprising:
generating latency statistics based at least in part the first latency; and
transmitting the latency statistics to an interested entity.

3. The method of claim 2, wherein the latency statistics are transmitted via a direct memory access (DMA) operation.

4. The method of claim 1, further comprising:
receiving a second enqueue notification of a second enqueue operation from the network device engine, wherein the second enqueue notification comprises the queue identifier associated with the queue and wherein the second enqueue operation corresponds to a second packet being placed into the queue;
incrementing, based on the second enqueue notification, the enqueue counter associated with the queue identifier; and
determining that the latency calculation flag corresponding to the queue identifier is set, wherein the determination that the latency calculation flag is set causes the latency calculation device not to calculate latency corresponding to the second enqueue notification.

5. The method of claim 1, further comprising:
receiving a second dequeue notification of a second dequeue operation from the network device engine, wherein the second dequeue notification comprises the queue identifier;
incrementing, based on the second dequeue notification, a dequeue counter associated with the queue identifier to obtain a current dequeue counter value;

determining that the current dequeue counter value and a latency start count value do not match, wherein the determination that the current dequeue counter value and the latency start count value do not match causes the latency calculation device not to calculate latency corresponding to the second dequeue notification.

6. The method of claim 1, wherein the latency calculation device is a field programmable gate array (FPGA).

7. The method of claim 1, wherein the latency calculation device and the network device engine are included in a network device.

8. The method of claim 7, wherein the network device is one selected from a group consisting of a switch and a router.

9. The method of claim 7, wherein the network device engine comprises the latency calculation device.

10. The method of claim 7, wherein the network device comprises a plurality of latency calculation devices.

11. A system for calculating latency comprising:
a network device comprising:
a network device engine comprising a queue identified by a queue identifier; and
a latency calculation device configured to:
receive a first enqueue notification of a first enqueue operation from the network device engine, wherein the first enqueue notification comprises the queue identifier associated with the queue and wherein the first enqueue operation corresponds to a first packet being placed into the queue;
increment, based on the first enqueue notification, an enqueue counter associated with the queue identifier to obtain a current enqueue counter value;
determine that a latency calculation flag corresponding to the queue identifier is not set; and
based on the determination that the latency calculation flag is not set:
set a latency start time based on receiving the first enqueue notification;
set a latency stop time based on receiving a first dequeue notification associated with a first dequeue operation; and
calculate a first latency by determining a time difference between the latency start time and the latency stop time.

12. The system of claim 11, wherein the latency calculation device is further configured to:
generate latency statistics based at least in part the first latency; and
transmit the latency statistics to an interested entity.

13. The system of claim 12, wherein the latency statistics are transmitted by the latency calculation device via a direct memory access (DMA) operation.

14. The system of claim 11, wherein the latency calculation device is further configured to:
receive a second enqueue notification of a second enqueue operation from the network device engine, wherein the second enqueue notification comprises the queue identifier associated with the queue and wherein the second enqueue operation corresponds to a second packet being placed into the queue;
increment, based on the second enqueue notification, the enqueue counter associated with the queue identifier; and
determine that the latency calculation flag corresponding to the queue identifier is set, wherein the determination that the latency calculation flag is set causes the latency calculation device not to calculate latency corresponding to the second enqueue notification.

15. The system of claim 11, wherein the latency calculation device is further configured to:
receive a second dequeue notification of a second dequeue operation from the network device engine, wherein the second dequeue notification comprises the queue identifier;
increment, based on the second dequeue notification, a dequeue counter associated with the queue identifier to obtain a current dequeue counter value;
determine that the current dequeue counter value and a latency start count value do not match, wherein the determination that the current dequeue counter value and the latency start count value do not match causes the latency calculation device not to calculate latency corresponding to the second dequeue notification.

16. The system of claim 11, wherein the latency calculation device is a field programmable gate array (FPGA).

17. The system of claim 11, wherein the network device is one selected from a group consisting of a switch and a router.

18. The system of claim 11, wherein the network device engine comprises the latency calculation device.

19. The system of claim 11, wherein the network device further comprises a plurality of latency calculation devices.

20. A non-transitory computer readable medium comprising instructions for calculating latency which, when executed, cause a computer processor to:
receive, at a latency calculation device and from a network device engine, a first enqueue notification of a first enqueue operation, wherein the first enqueue notification comprises a queue identifier associated with a queue and wherein the first enqueue operation corresponds to a first packet being placed into the queue;
increment, based on the first enqueue notification, an enqueue counter associated with the queue identifier to obtain a current enqueue counter value;
determine that a latency calculation flag corresponding to the queue identifier is not set; and
based on the determination that the latency calculation flag is not set:
set a latency start time based on receiving the first enqueue notification;
set a latency stop time based on receiving a first dequeue notification associated with a first dequeue operation; and
calculate a first latency by determining a time difference between the latency start time and the latency stop time.

21. The method of claim 1, wherein setting the latency start time based on receiving the first enqueue operation comprises:
determining a first time at which the first enqueue notification of the first enqueue operation was received;
storing the first time as the latency start time associated with the queue identifier;
storing the current enqueue counter value as a latency start count value; and
setting the latency calculation flag.

22. The method of claim 21, wherein setting the latency stop time based on receiving the first dequeue notification comprises:
receiving the first dequeue notification of the first dequeue operation from the network device engine, wherein the first dequeue notification comprises the queue identifier associated with the queue and wherein the first dequeue operation corresponds to the first packet being removed from the queue;

incrementing, based on the first dequeue notification, a dequeue counter associated with the queue identifier to obtain a current dequeue counter value.

23. The method of claim 22, wherein calculating the first latency further comprises:
   determining that the current dequeue counter value and the latency start count value match;
   determining a second time at which the notification of the first dequeue operation was received;
   storing the second time as a latency stop time associated with the queue identifier; and
   removing the latency calculation flag.

24. The system of claim 11, wherein, to set the latency start time based on receiving the first enqueue operation, the latency calculation device is further configured to:
   determine a first time at which the first enqueue notification of the first enqueue operation was received;
   store the first time as the latency start time associated with the queue identifier;
   store the current enqueue counter value as a latency start count value; and
   set the latency calculation flag.

25. The system of claim 24, wherein, to set the latency stop time based on receiving the first dequeue operation, the latency calculation device is further configured to:
   receive a first dequeue notification of a first dequeue operation from the network device engine, wherein the first dequeue notification comprises the queue identifier associated with the queue and wherein the first dequeue operation corresponds to the first packet being removed from the queue; and
   increment, based on the first dequeue notification, a dequeue counter associated with the queue identifier to obtain a current dequeue counter value.

26. The system of claim 25, wherein, to calculate the first latency, the latency calculation device is further configured to:
   determine that the current dequeue counter value and the latency start count value match;
   determine a second time at which the notification of the first dequeue operation was received;
   store the second time as the latency stop time associated with the queue identifier; and
   remove the latency calculation flag.

27. The non-transitory computer readable medium of claim 20, wherein the instructions to set the latency start time based on receiving the first enqueue operation comprise instructions to:
   determine a first time at which the first enqueue notification of the first enqueue operation was received:
   store the first time as the latency start time associated with the queue identifier;
   store the current enqueue counter value as a latency start count value; and
   set the latency calculation flag.

28. The non-transitory computer readable medium of claim 27, wherein the instructions to set the latency stop time based on receiving the first dequeue operation comprise instructions to:
   receive a first dequeue notification of a first dequeue operation from the network device engine, wherein the first dequeue notification comprises the queue identifier associated with the queue and wherein the first dequeue operation corresponds to the first packet being removed from the queue; and
   increment, based on the first dequeue notification, a dequeue counter associated with the queue identifier to obtain a current dequeue counter value.

29. The non-transitory computer readable medium of claim 28, wherein the instructions to calculate the first latency comprise instructions to:
   determine that the current dequeue counter value and the latency start count value match;
   determine a second time at which the notification of the first dequeue operation was received;
   store the second time as the latency stop time associated with the queue identifier; and
   remove the latency calculation flag.

* * * * *